United States Patent
Kataoka et al.

(10) Patent No.: US 6,527,903 B1
(45) Date of Patent: Mar. 4, 2003

(54) SUBSTRATE BONDING METHOD, BONDED PRODUCT, INK JET HEAD, AND IMAGE FORMING APPARATUS

(75) Inventors: Masaki Kataoka, Ebina (JP); Michiaki Murata, Ebina (JP); Norikuni Funatsu, Ebina (JP); Kumiko Tanaka, Ebina (JP); Toshimichi Iwamori, Ebina (JP)

(73) Assignee: Fuji Xerox Co. Ltd., Tokyo (JP)

( * ) Notice: Subject to any disclaimer, the term of this patent is extended or adjusted under 35 U.S.C. 154(b) by 1 day.

(21) Appl. No.: 09/651,726

(22) Filed: Aug. 30, 2000

(30) Foreign Application Priority Data

Nov. 2, 1999 (JP) .......................................... 11-312456

(51) Int. Cl.[7] .............................................. B32B 31/20
(52) U.S. Cl. ........................ 156/273.7; 156/273.9; 156/274.8; 156/275.5; 156/275.7; 156/312
(58) Field of Search ........................ 156/272.2, 273.7, 156/273.9, 274.4, 274.8, 275.5, 275.7, 312

(56) References Cited

U.S. PATENT DOCUMENTS 4,382,113 A * 5/1983 Schwartz et al. ............ 156/153
4,482,801 A * 11/1984 Habata et al. ............ 156/273.7
4,673,450 A * 6/1987 Burke ........................ 156/153
5,061,987 A * 10/1991 Hsia ............................ 257/702
5,362,213 A * 11/1994 Komatsu et al. ............... 310/22
5,482,598 A * 1/1996 Isaka et al. ................. 205/656
5,981,945 A * 11/1999 Spaeth et al. ................ 250/216

FOREIGN PATENT DOCUMENTS

| JP | 61-230954 | 10/1986 |
| JP | 63-34152 | 2/1998 |
| JP | 11-245426 | 9/1999 |

* cited by examiner

*Primary Examiner*—Sam Chuan Yao
(74) *Attorney, Agent, or Firm*—Morgan, Lewis & Bockius LLP

(57) ABSTRACT

A satisfactory bonding is implemented at low cost. In a step, a resin layer is formed on a bonding surface side of a silicon wafer on which portion are formed electro-thermal transducers. In a later step, the silicon wafer and another silicon wafer are aligned and fixed temporarily, then the atmosphere is set at a pressure of $10^{-3}$ mbar or lower and the temperature is set at 300° C. or higher, and voltage is applied across the both wafers while pressure is applied to the wafers. When the value of an electric current flowing across the wafers has reached a level of a certain current value or lower, the application of the voltage is stopped and the atmosphere is opened to the atmospheric pressure while reducing the temperature.

12 Claims, 12 Drawing Sheets

[Bonding Gap]

SUBSTRATE BONDING METHOD, BONDED PRODUCT, INK JET HEAD, AND IMAGE FORMING APPARATUS

BACKGROUND OF THE INVENTION

1. Field of the Invention

The present invention relates to a substrate bonding method, a bonded product, an ink jet head, and an image forming apparatus. More particularly, the present invention is concerned with a substrate bonding method, a bonded product, an ink jet head, and an image forming apparatus, which are to be used in fabricating functional devices by various micromachining techniques.

2. Description of the Prior Art

According to a substrate bonding method so far adopted generally, an adhesive is used for bonding. However, as to functional devices fabricated using various micromachining techniques, there is a conspicuous tendency to microsizing and, in bonding using an adhesive, an inappropriate thickness of the adhesive and protrusion thereof give rise to a serious problem.

For example, as an ink jet head fabricating method, there has been proposed the use of two substrates bonded together, typical of which is disclosed in Japanese Published Unexamined Patent Application No. Sho 61-230954. However, as ink flowing grooves formed in bonding surfaces become higher in density and smaller in size, the application of an adhesive used in bonding becomes difficult. As a remedial measure there is proposed in Japanese Published Unexamined Patent Application No. Sho 63-34152 a technique in which an adhesive is applied thin and selectively.

Recently, however, there has been an increasing tendency to a smaller dot size with a view to attaining a high image quality in an ink jet head, and the size of a nozzle as an ink jet orifice is also becoming very small to meet the tendency to smaller dots. Such a reduction of the nozzle size is giving rise to the following several problems also in the method proposed in Japanese Published Unexamined Patent Application No. Sho 63-34152.

Figure 9A:
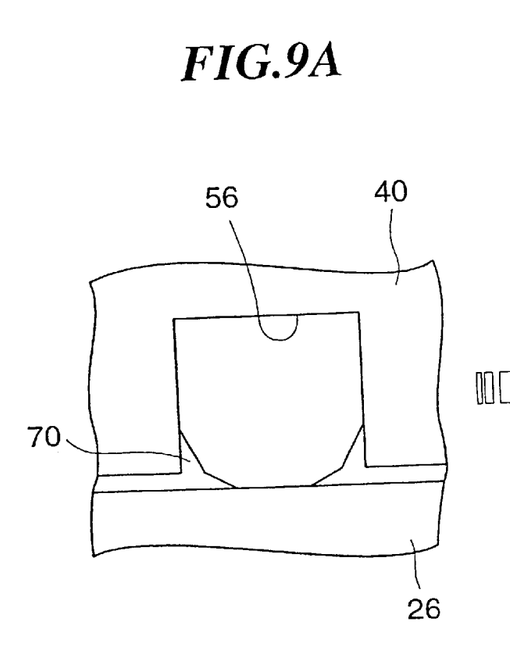
FIGS. 9A and 9B illustrate a bonded state of an ink flowing path using an adhesive according to the prior art.
Figure 9B:
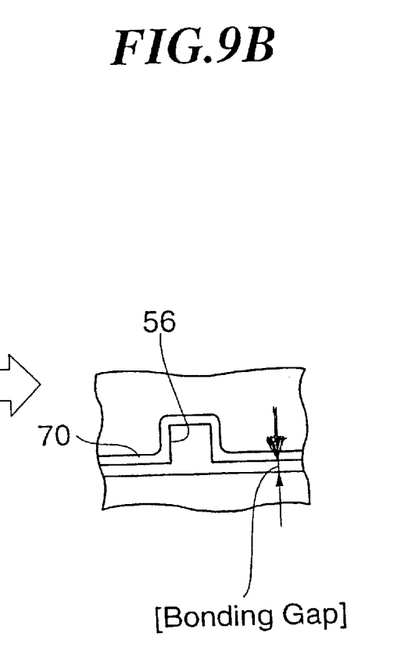

(1) The groove size in bonded surfaces is becoming extremely small with the recent tendency to a smaller nozzle size, and even a slight protrusion of an adhesive results in the nozzle and ink flowing grooves being filled up with the adhesive. FIG. 9 shows ink jet head nozzle portions. The nozzle shown in FIG. 9A is a conventional 400 DPI equivalent nozzle having an ink droplet generating width of about 20 $\mu$m, and with this size, there is no fear of the nozzle being filled up with an adhesive 70 even by protrusion of the adhesive. But in case of such a reduced-size nozzle of about 5 $\mu$m in width as in FIG. 9B, which is equivalent to 1600 DPI and which generates ink droplets, the entire nozzle opening is filled up with protruded adhesive 70 and cannot eject ink.

(2) If the adhesive coating is made thin for preventing the foregoing protrusion of the adhesive into the ink flowing paths, there will occur defective sealing between ink flowing paths due to adhesive deficiency in a poor adhesion area which is attributable to the presence of fine convexes and concaves in bonding substrate surfaces or substrate warping, with consequent occurrence of an inconvenience such that a pressure developed for the ejection of ink in a certain ink flowing path escapes to an ink flowing path adjacent thereto. Therefore, for the purpose of improving the flatness of bonding substrate surfaces there is adopted, for example, a planarizing process (Japanese Unexamined Patent Application No. Hei 11-245426) using CMP (Chemical Mechanical Polish). In bonding substrates of a large area, however, due to warping of wafers or the presence of particles, a substrate-to-substrate gap (bonding gap) of about 1.0 $\mu$m or less occurs in the foregoing defective adhesion area.

Figure 10A:
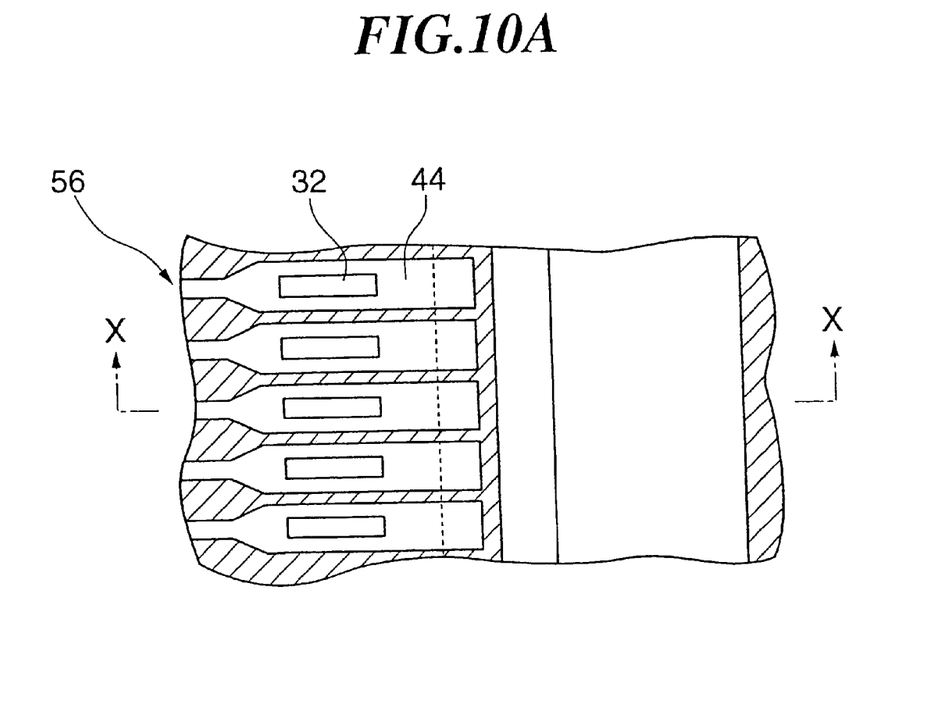
FIGS. 10A and 10B are sectional views of an ink jet head according to the prior art.
Figure 10B:
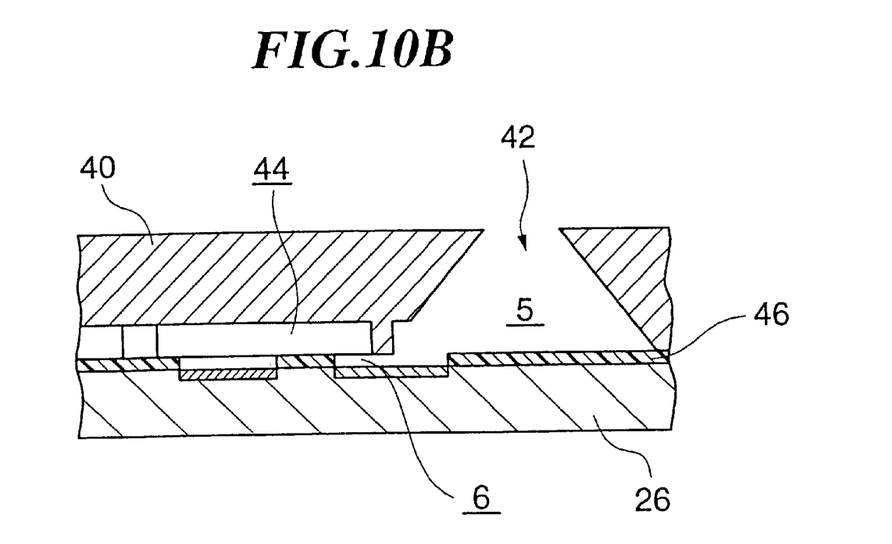
Figure 11A:
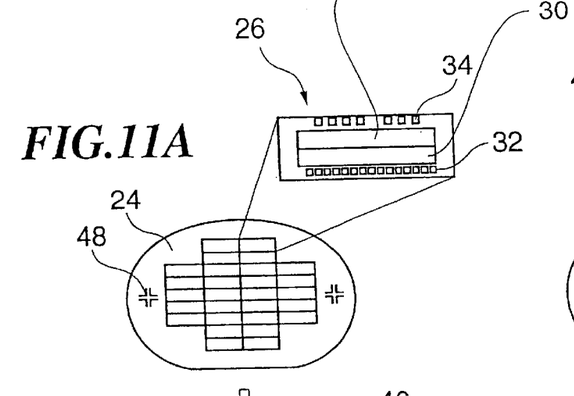
FIGS. 11A to 11F illustrate a process flow in the manufacture of an ink jet head using an adhesive according to the prior art.
Figure 11B:
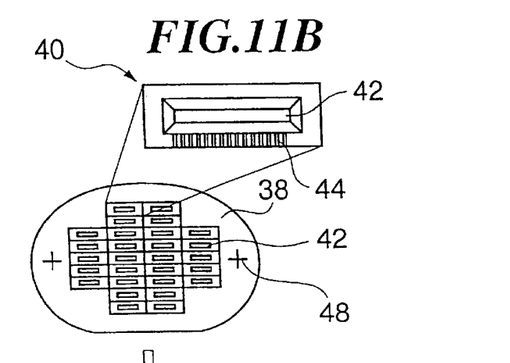
Figure 11C:
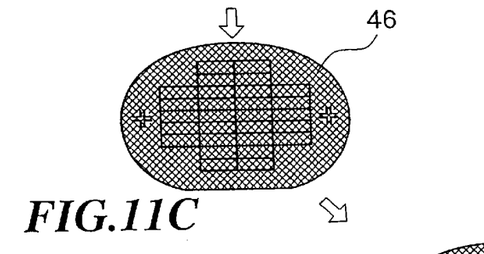
Figure 11D:
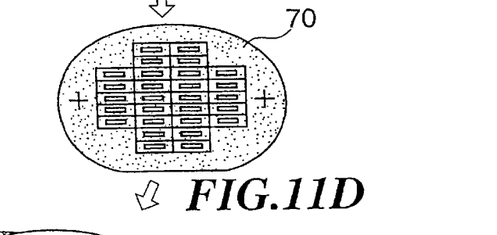
Figure 11E:
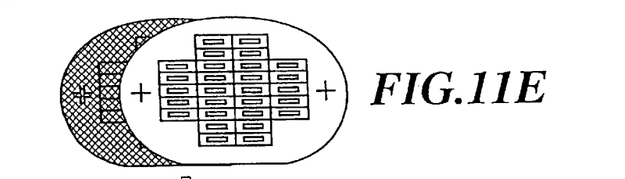
Figure 11F:
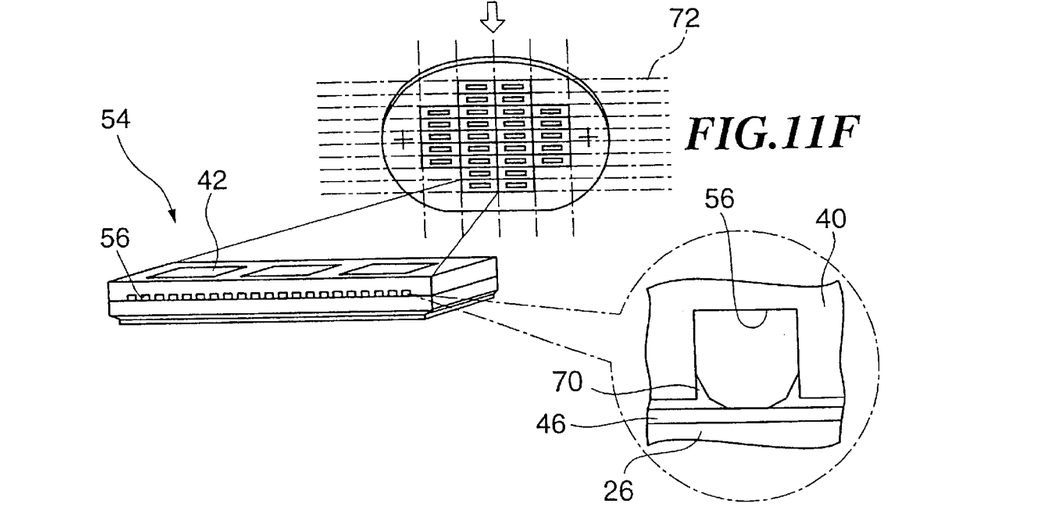

(3) As a result of having used the ink jet nozzle for a long period of time, a thin adhesive film which has been transferred to a protruded portion of the adhesive or to an unbonded portion comes off and may cause clogging of the nozzle. FIG. 10A shows an ink flowing path structure in the ink jet head and FIG. 10B is a sectional view taken on line X—X in FIG. 10A. In the case where a thin adhesive film is transferred to a convex portion formed on an ink flowing path substrate 40 and the substrate 40 and a device substrate 26 are bonded together, there occurs a state in which the adhesive is transferred but bonding is not made at rear wall portions of individual flow paths 44 corresponding to bypaths.

In an effort to solve the abovementioned problems, various techniques have been proposed which do not use any adhesive, such as eutectic bonding and room temperature interface bonding. In eutectic bonding, however, it is necessary to form a thin Au film, resulting in an increase of the manufacturing cost. In room temperature interface bonding, it is necessary to perform a special interface treatment using an ultra-high vacuum or an ion beam, thus requiring the use of special equipment.

Further, in anodic bonding, it is necessary to apply a voltage as high as several hundred volts, with consequent danger of transistors, etc. being destroyed in case of a substrate having an electronic circuit.

As a bonding method which is carried out through a resin layer, there is known a thermocompression bonding, but it is necessary to apply a high pressure ($4.9 \times 10^5$ to $9.8 \times 10^5$ Pa), thus requiring the use of special equipment. In addition, there arises a problem in point of reliability of a circuit-mounted board because of application of a high pressure. In forming fine patterns, there arises the same problem as in the use of an adhesive in point of thickness and protrusion of a resin layer.

SUMMARY OF THE INVENTION

The present invention has been accomplished for solving the abovementioned problems and provides a substrate bonding method, a bonded product obtained by using the substrate bonding method, an ink jet head, and an image forming apparatus, capable of implementing a satisfactory bonded state at low cost.

For solving the foregoing problems, in the substrate bonding method according to the present invention, a resin material is sandwiched between plural substrates and voltage is applied across the plural substrates to bond the substrate together. In the present invention, a plus side of a resin material which has been dipole-polarized by the application of voltage across plural substrates and a substrate on a minus electrode side attract each other by an electrostatic attraction, while a minus side of the resin material and a substrate on a plus electrode side attract each other by an electrostatic attraction, with the result that the resin material gets in fine concaves and convexes on the substrate interface, thus creating an anchor effect, whereby the substrates are bonded together through the resin material. Further, it is presumed that minus ions migrate from the resin material to the substrate side and undergoes a chemical reaction with the material of the substrate, with consequent chemical bonding reinforcing the substrate bonding. Thus, the substrate bonding does not require the use of any adhesive, nor is it necessary to use any equipment for implementing high temperature and high pressure conditions. Consequently, a satisfactory bonding free of adhesive protrusion can be attained at low cost.

It is preferable that the applied voltage be 350V or lower and be 50V or so. With such a level of voltage, the resin material is shifted moderately and a satisfactory bonding is obtained; in addition, since such a high voltage of several hundred volts as in the anodic bonding is not applied, it is not necessary to use any special equipment and bonding can be done at low cost.

By applying pressure to the plural substrates at the time of the voltage application there can be attained a better bonded state.

It is preferable that the plural substrates be held at a temperature of 200° C. or higher at the time of the voltage application.

It is preferable that a maximum temperature of the plural substrates at the time of the voltage application be a heat-resisting temperature of the resin material or lower and a glass transition point temperature of the resin material or higher. If the substrate temperature is the glass transition point temperature of the resin material or higher, it becomes easier for the resin material to move, affording a good bonded state; in addition, there is little residual stress at completed bonding.

By maintaining the resin material before the bonding in an uncured state and by allowing it to cure completely simultaneously with or after the bonding, there can be obtained a good bonded state without the need of planarizing bonding surfaces.

At least one of the plural substrates is formed by silicon.

The substrate bonding method according to the present invention can adopt the procedure of raising the temperature of the plural substrates to a first predetermined temperature, applying a predetermined pressure to the plural substrates, applying a predetermined voltage across the plural substrates, starting to reduce the temperature of the plural substrates after the value of an electric current flowing across the plural substrates has reached a level of a predetermined current value or lower or upon the lapse of a predetermined time after the voltage application, and stopping the application of the voltage and the application of the pressure after the temperature of the plural substrates has dropped to a second predetermined temperature or lower.

The application of the pressure across the plural substrates may be performed in at least two stages of pressure levels during the rise in temperature of the plural substrates. According to this bonding method, since the pressure applied to the substrates is increased against shrinkage of the resin material with an increase in temperature, a better bonded state can be obtained while maintaining a certain gap on the bonded surfaces.

By forming a metallic pattern on at least one of the plural substrates with bonding surfaces of the substrates therebetween, the potential on the substrate upon the application of voltage becomes almost uniform, thus affording a uniform and satisfactory bonded state.

If the bonding surfaces of at least one of the plural substrates and the resin material are subjected to cleaning and activation before the bonding, it will be possible to obtain the foregoing anchor effect more efficiently and also possible to effect a chemical reaction in a satisfactory manner, so that a good bonded state can be attained.

The bonded product according to the present invention is obtained by the above substrate bonding method.

The ink jet head according to the present invention is constituted by the above bonded product.

In the ink jet head according to the present invention, on one of a pair of substrates which constitute the bonded product, there is formed a pattern including fine ink flowing grooves while on the other substrate is formed a pattern including plural circuits.

In the present invention it is also possible to constitute an image forming apparatus provided with the above ink jet head.

BRIEF DESCRIPTION OF THE DRAWINGS

Preferred embodiments of the present invention will be described in detail with reference to the accompanying drawings, wherein.

DETAILED DESCRIPTION OF THE PREFERRED EMBODIMENTS

[First Embodiment]

This embodiment will be described below with reference to the drawings.

Figure 1:
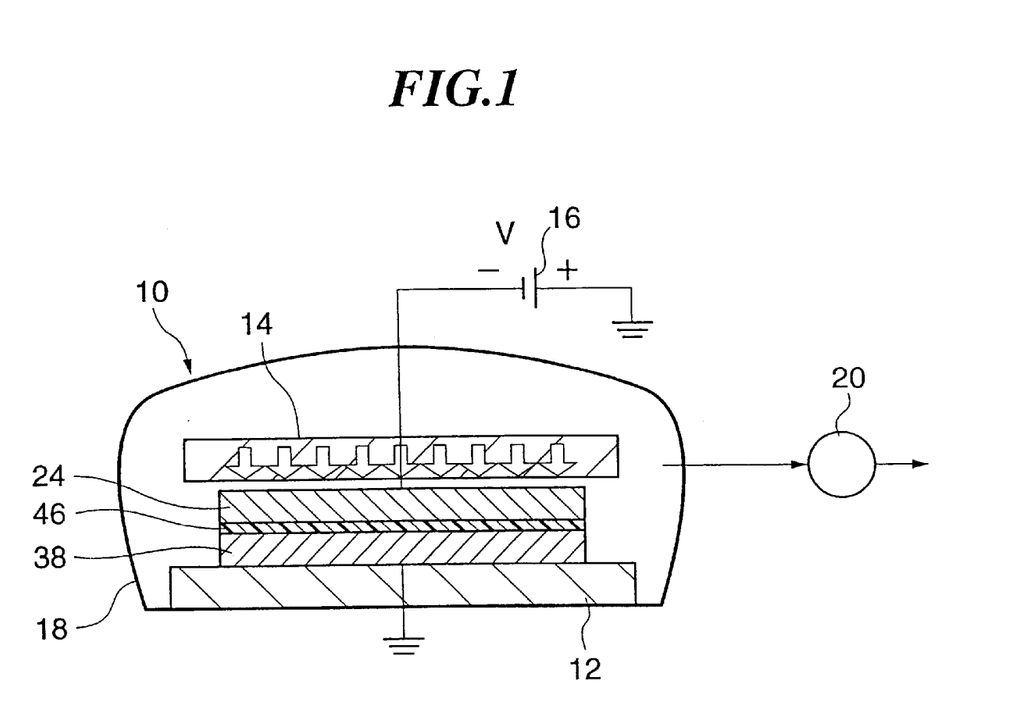
FIG. 1 is a schematic diagram of a bonding apparatus according to the first embodiment of the present invention.

In a bonding apparatus 10 according to this embodiment, as shown in FIG. 1, a table 12 for placing substrates to be bonded thereon and a pressing unit 14 for applying pressure to the substrates are disposed inside an outer wall 18, and a vacuum pump 20 for evacuating the interior of the bonding apparatus 10 is connected to the outer wall 18, to which is also connected a power supply 16 for the application of voltage to the substrate. The bonding apparatus 10 used in this embodiment is not required to be a special one. Apparatus available commercially for anodic bonding, (e.g., EV500 Series manufactured by Electronic Vsions and Substrate Bonder 5B6 manufactured by Karl Suss), may be used. However, in case of bonding wafers of a large area or in case of performing bonding at a temperature of above the glass transition point temperature of a resin layer which will be described later, it is desirable to use a multi-point electrode or a plate electrode for preventing unevenness in bonding surfaces when bonding is performed.

Figures 2A, 2B, 2C, 2D, 2E:
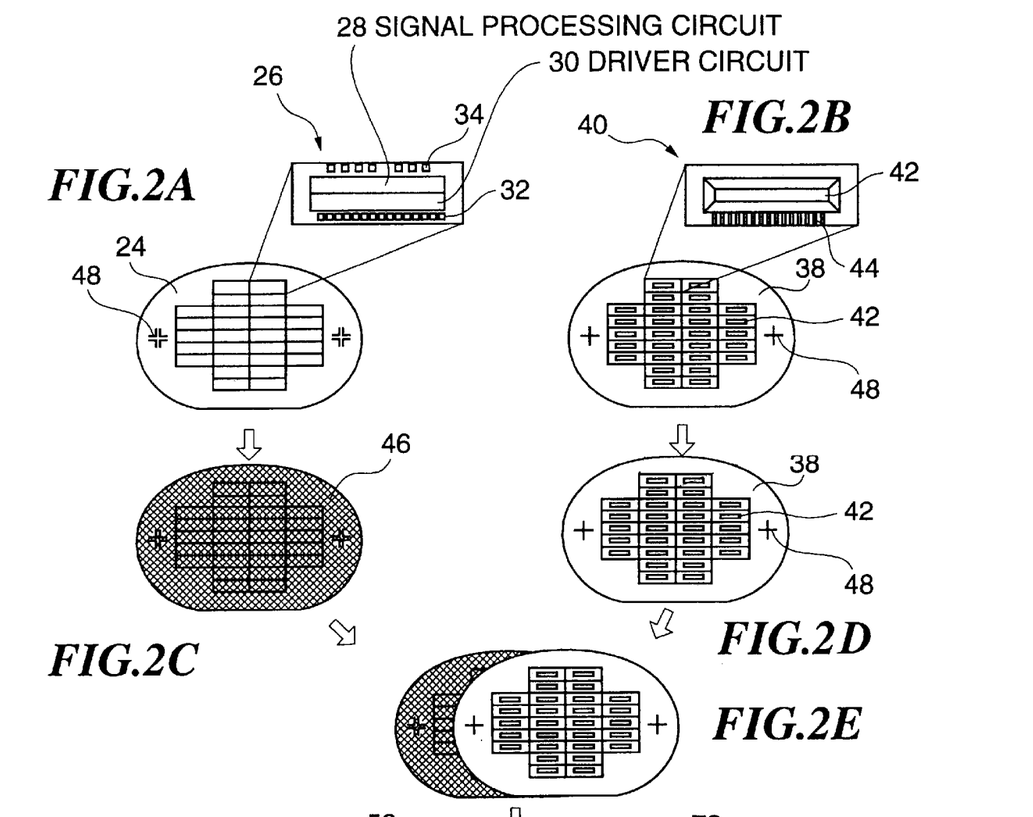
FIGS. 2A to 2F illustrate a process flow in the manufacture of an ink jet head in the first embodiment.
Figure 2F:
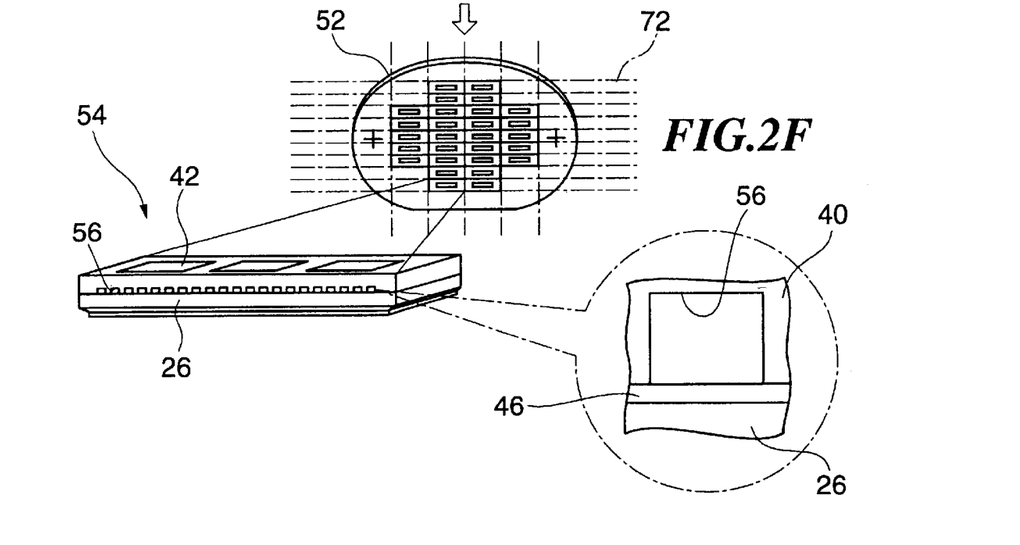

FIG. 2 illustrates a manufacturing process for an ink jet head 54 to be fabricated in this embodiment. In step (A), plural device substrates 26 are formed on a silicon wafer 24 in accordance with an LSI process. On each device substrate 26 are formed a signal processing circuit 28, a driver circuit 30, an electro-thermal transducer 32, electric signal connecting pads 34, and an electric wiring (not shown) for the connection of these components.

In step (B), plural ink flowing path substrates 40 are formed on a silicon wafer 38. In each ink flowing path substrate 40 are formed an ink supply port 42 and ink flowing paths 44, for example, by anisotropic etching (ODE) or RIE (Reactive Ion Etching).

In step (C), a resin layer 46 as a protective film against ink is formed on a bonding surface side of a portion of the silicon wafer 24 on which portion the electro-thermal transducers 32 are provided, by a conventional LSI process. Here, using a photosensitive resin (e.g., trade name: Probimide 7520, Probimide HTR-3-200, Photoness UR5100FX, Lthocoat PI-400) and through the steps of application→prebaking→exposure→development→curing, there can be formed the resin layer 46 on the silicon wafer 24 with a high adhesion and in a highly accurately aligned state. The portions near apertures formed in the portions of the resin layer 46 corresponding to the electro-thermal transducers 32 and the electric signal connecting pads 33 become convex with respect to the aperture-free area due to film shrinkage in the curing step though the degree of convex differs depending on the thickness and material of the resin layer 46. Although in this embodiment an average film thickness of the resin layer 46 after the curing step is designed to be about 5 microns, there occurred a convex shape of about 1.0 microns. In addition, on the silicon wafer 24 before formation of the resin layer 46 there exist concaves and convexes (3 microns or so) caused by circuit formation. Although leveling is done to some extent by the application of the resin layer 46, concaves and convexes of about 2 microns, including the aforesaid convexes caused by curing, are present on an upper surface of the resin layer 46 as a bonding surface. To remedy such an uneven state, the resin layer 46 is planarized by CMP to afford a planarized surface of about 0.5 micron or less in terms of concaves and convexes.

Although in this embodiment a photosensitive resin is used as the resin layer 46 used for bonding, no limitation is made thereto, but a non-photosensitive resin (e.g., trade name: Sumitomo Bakelite CRC-6061C, Semikofine SP740, U Varnish S, PIX-3400) is also employable. Further, even a dry film-like resin is also employable.

In step (E), the silicon wafer 24 and the silicon wafer 38 are accurately aligned and temporarily fixed by means of a substrate alignment device and with use alignment marks 48 provided for each wafer. The alignment is performed in such a manner that the electrothermal transducers 32 and the individual ink flowing paths 44 are opposed to each other.

Heretofore, such a transfer step of adhesive 70 as shown in step (D) of FIG. 11 has been conducted. In this step, the adhesive 70, which is applied thin onto film by a spin coating method, is transferred to convex portions of a silicon wafer 38 on the side where individual ink flowing paths 44 are formed, in accordance with the method proposed in Japanese Published Unexamined Patent Application No. Sho 63-34152. Bonding of a pair of silicon wafers in step (E) (prior art) can be done by setting the paired wafers in a temporarily fixed state onto a vacuum heating/pressurizing apparatus, then heat-treating the paired wafers at about 200° C. for 4 hours while applying a pressure of about $9.8 \times 10^4$ Pa, and allowing the applied adhesive 70 to cure. The step (D) shown in FIG. 11 is not needed in this embodiment of the present invention, thus, only the silicon wafer 38 is shown in FIG. 2D.

Figure 3:
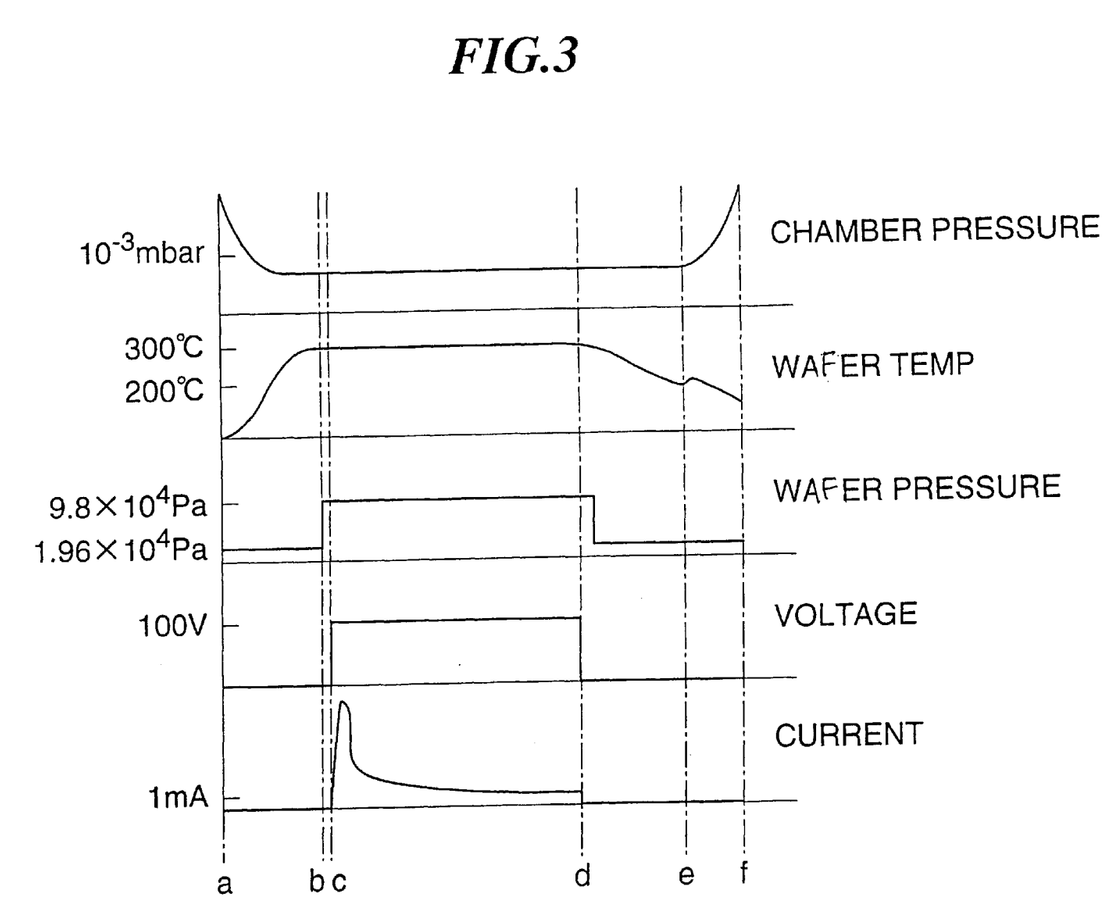
FIG. 3 illustrates bonding conditions in the first embodiment.

Now, with reference to FIG. 3, the following description is provided about a bonding procedure for bonding the aligned and temporarily fixed silicon wafers 24, 38. First, a wafer pair 52 made up of the temporarily fixed silicon wafers 24 and 38 is set on the table 12 of the bonding apparatus 10 in such a manner that the silicon wafer 24 side becomes a negative electrode and the silicon wafer 38 side becomes a positive electrode. Next, the vacuum pump 20 is operated to place the wafers in a reduced pressure condition in the interior of the bonding apparatus 10 and at the same time power is fed to an apparatus heater (not shown) to increase the temperature of the wafer pair 52 (see a in FIG. 3). When the internal pressure of the bonding apparatus 10 has dropped to $10^{-3}$ mbar or less and the temperature of the wafer pair 52 has reached 300° C. or so, a pressure of about $9.8 \times 10^4$ Pa is applied in a direction perpendicular to the bonding surfaces of the wafer pair 52 (see b in FIG. 3) and a voltage of about 100V is applied to the wafer pair (see c in FIG. 3). After the voltage application, an electric current flowing through the wafer pair 52 is monitored, and when the current value has become constant or less, the voltage application is stopped and the apparatus heater is turned OFF, allowing to temperature to drop (see d in FIG. 3). Thereafter, the pressure applied to the wafer pair 52 is reduced to $1.96 \times 10^4$ Pa (see d–e in FIG. 3), and when the temperature has become constant or less, the vacuum pump 20 is turned OFF to let the interior of the bonding apparatus 10 open to the atmospheric pressure (see e in FIG. 3). Lastly, the pressure on the wafer pair 52 is relieved and the wafer pair 52 is taken out of the apparatus (see f in FIG. 3). Now, the step (E) for the bonding is completed.

Thus, in this step the wafer environment in the bonding apparatus is pressure-reduced using the vacuum pump 20 at the time of bonding wafers. This is for preventing electric discharge in the application of a high voltage and for preventing device contamination caused by a chemical reaction at an elevated temperature or by a gas discharged a tiny amount from the resin layer 46. It is not an essential condition in this step. The bonding may be carried out in an inert gas atmosphere without reducing the pressure of the wafer atmosphere.

The wafer pair 52 thus bonded together is then subjected to a dicing process, in which it is cut and separated chip by chip and, if necessary, subjected to cleaning and inspection, to afford a large number of inkjet heads 54. Since the resin layer 46 is exposed to the nozzle portion 56, the resin layer 46 burrs in the vicinity of the nozzle portion 56 at the time of cutting by dicing, which burr, however, can be removed to a satisfactory extent by the method proposed in Japanese Patent No. 2827884.

According to this embodiment, since the resin layer 46 so far used as a protective film is used for the bonding without using an adhesive, there occurs no adhesive protrusion and a satisfactory bonding can be attained even if the bonding surfaces are slightly uneven. In addition, since the conventional adhesive applying step (D) can be omitted and the resin layer 46 is utilized as it is as a protective film, it is not necessary to add any new step and it is possible to attain the reduction of cost. Further, since an adhesive is not used, there is no fear of nozzle clogging caused by fragments of an adhesive which has come off after the use thereof for a long period, with consequent improvement in reliability of the head.

When viewed from the standpoint of process, the bonding method of this embodiment is the closest to an anodic bonding for Si and glass, but since the same substrate is used for both the side where a resin layer is formed and the bonding side, there is no fear of a positional deviation or warping caused by a difference in thermal expansion coefficient. Further, since the amount of deformation of the resin layer caused by an electrostatic attraction is larger than that of glass, there is attained a high bonding uniformity and there is obtained a good bonded substrate with reduced residual stress, even without setting an initial flatness so high at the bonding interface. In this embodiment, moreover, as compared with the use of glass which requires the application of a voltage as high as several hundred volts, the bonding can be done with a voltage of several ten volts, so even in case of a substrate with an electronic circuit mounted thereon, there is no danger of damage to transistors, etc.

In the conventional thermocompression bonding method which is carried out through a resin layer, special equipment is needed because it is necessary a high pressure ($4.9 \times 10^5$ to $9.8 \times 10^5$ Pa) at a high temperature, further, there arises a problem in point of reliability of a circuit-mounted substrate because a high pressure is applied and there also arises a protrusion problem of the resin layer. According to this embodiment of the present invention, however, an apparatus available commercially as an anodic bonding apparatus is employable and there may be adopted low temperature and low pressure in comparison with the above conventional thermocompression bonding method.

Although the bonding method of this embodiment was used for substrate-to substrate bonding in the manufacture of an ink jet head, this constitutes no limitation. It may be utilized in the manufacture of micromachines such as pressure sensors and micropumps.

The principle of bonding in this embodiment is presumed to be as follows.

FIG. 8 shows a typical example of electric charge, potential, and field distribution observed when voltage is applied between the silicon wafer 24 with the resin layer 46 formed thereon and the silicon wafer 38 bonded thereto. The material of the resin layer 46 shown in the same figure is a polyimide which exhibits dipole type polarization. The presence of movable ions can be recognized in the interior of the resin layer 46. As shown in FIG. 8A, upon application of voltage across the silicon wafers 24 and 38, ions exhibiting dipole type polarization in the interior of the resin layer 46 face in a certain direction and the bonding surface of the silicon wafer 24 which is charged minus and the plus side of the resin layer 46 attract each other by virtue of an electrostatic attraction, while the bonding surface of the silicon wafer 38 which is charged plus and the minus side of the resin layer 46 attract each other under electrostatic attraction. Thus, it is presumed that the resin material shifts and gets in fine concaves and convexes on the bonding surface and that a bonding force based on anchor effect is created. In the bonding interface where both wafers attract each other under the action of an electrostatic force, it is presumed that minus ions migrate from the resin layer 46 side to the silicon wafer 38 side, inducing a chemical bond (Si—O—, etc.), with consequent occurrence of a chemical bonding force.

Therefore, if the bonding surfaces of at least one of the substrates to be bonded and the resin layer are subjected to cleaning and activation prior to the bonding, it is possible to improve the bonding force and the bonding reliability. As such a pretreatment there may be adopted, for example, UV/O3 cleaning, fluoric acid treatment, or dipping using an alkali solution, but it is preferable to select the most suitable treatment according to the materials of the substrates and resin layer used.

[Second Embodiment]

In this second embodiment, explanations of the same portions as in the first embodiment will be omitted and only different portions will be explained.

Figure 4:
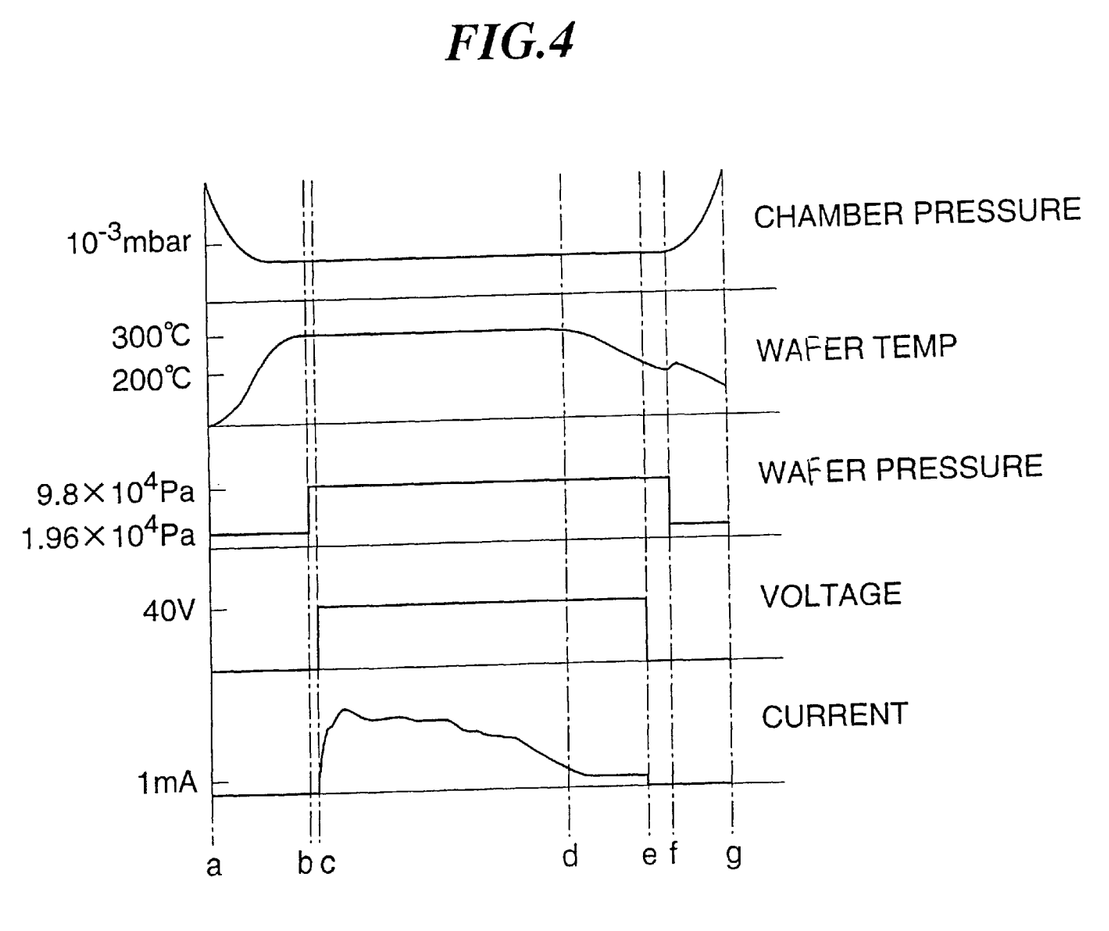
FIG. 4 illustrates bonding conditions in the second embodiment.

With reference to FIG. 4, the following description is now provided about in what procedure silicon wafers 24 and 38 are bonded together (corresponding to the foregoing step (E)).

A vacuum pump 20 is operated to start reducing pressure of a wafer environment in the interior of a bonding apparatus 10, and power is fed to an apparatus heater (not shown) to increase the temperature of a wafer pair 52. At this time point, in order to ensure the temperature control for the wafer pair 52 and thereby ensure contact with a temperature control unit in the apparatus, a minimum pressure of about $1.96 \times 10^4$ Pa is applied to the wafer pair 52. (a in FIG. 4)

When the internal pressure of the apparatus 10 has reached a level below $10^{-3}$ mbr and the temperature of the wafer pair 52 has reached a desired level (e.g., 300° C.), a pressure of about $9.8 \times 10^4$ Pa is applied in a direction perpendicular to the bonding surfaces of the wafer (b in FIG. 4) and thereafter a voltage of about 40V is applied to the wafer pair 52. (c in FIG. 4)

After the application of the voltage, an electric current flowing across the wafers of the wafer pair 52 is monitored, and when the current value has reached a level below a certain value (e.g., 1 mA), the apparatus heater is turned OFF to let the temperature drop. (d in FIG. 4)

When the temperature has dropped to a certain level (e.g., 200° C.) or less, the voltage application is stopped (e in FIG. 4), then the pressure applied to the wafers is reduced to the initial value and the vacuum pump 20 is turned OFF to let the interior of the bonding apparatus open to the atmospheric pressure (f in FIG. 4). Lastly, the pressure on the wafer pair 52 is released and the wafer pair is taken out to the exterior of the apparatus (g in FIG. 4). Now, the bonding process is completed.

Although in this embodiment the maximum temperature in the application of voltage is set at a temperature of 300° C. or higher, no limitation is made thereto. The temperature in question may be set at a temperature of the heat-resisting temperature of the resin material or lower used and the glass transition point temperature of the resin material or higher, preferably a temperature 10° to 60° C. higher than the glass transition point temperature. In this case, the resin layer 46 which has been transferred onto the silicon wafer 24 becomes easier to move and a satisfactory bonding is ensured even in the presence of a slight bonding gap. Further, since there is little residual stress at the end of bonding, it is possible to effect the bonding in a satisfactory manner. If the maximum temperature in the voltage application is set too high relative to the glass transition point of the resin material, the amount of movement of the resin material will become too large and the resin material will move toward the bonding plane even at a weak potential difference, thus making it impossible to obtain a desired bonding quality.

Also in this second embodiment there is obtained a satisfactory bonded state as in the first embodiment.

[Third Embodiment]

Also in this third embodiment, explanations of the same portions as in the previous embodiments will be omitted and only different portions will be explained.

In the third embodiment, the resin layer planarizing step (C) adopted as a bonding pretreatment in the previous embodiments is omitted and there is attained a bonding of a high bonding force.

On a bonding surface side of a silicon wafer 24 with electro-thermal transducers 32 provided thereon there is formed a resin layer 46 by a conventional LSI process which layer is to be used later for bonding. How to form the resin layer 46 is the same as in the first embodiment, but in this third embodiment the curing step as the final resin layer forming step is carried out at a temperature below a completely curing temperature of the resin layer. For example, for a resin material which cures at 400° C., curing is carried out at a sufficiently lower temperature (e.g., 120° C. or so). As a result, the resin layer 46 has scarcely any hardness and is free of any concave or convex based on curing.

Figure 5:
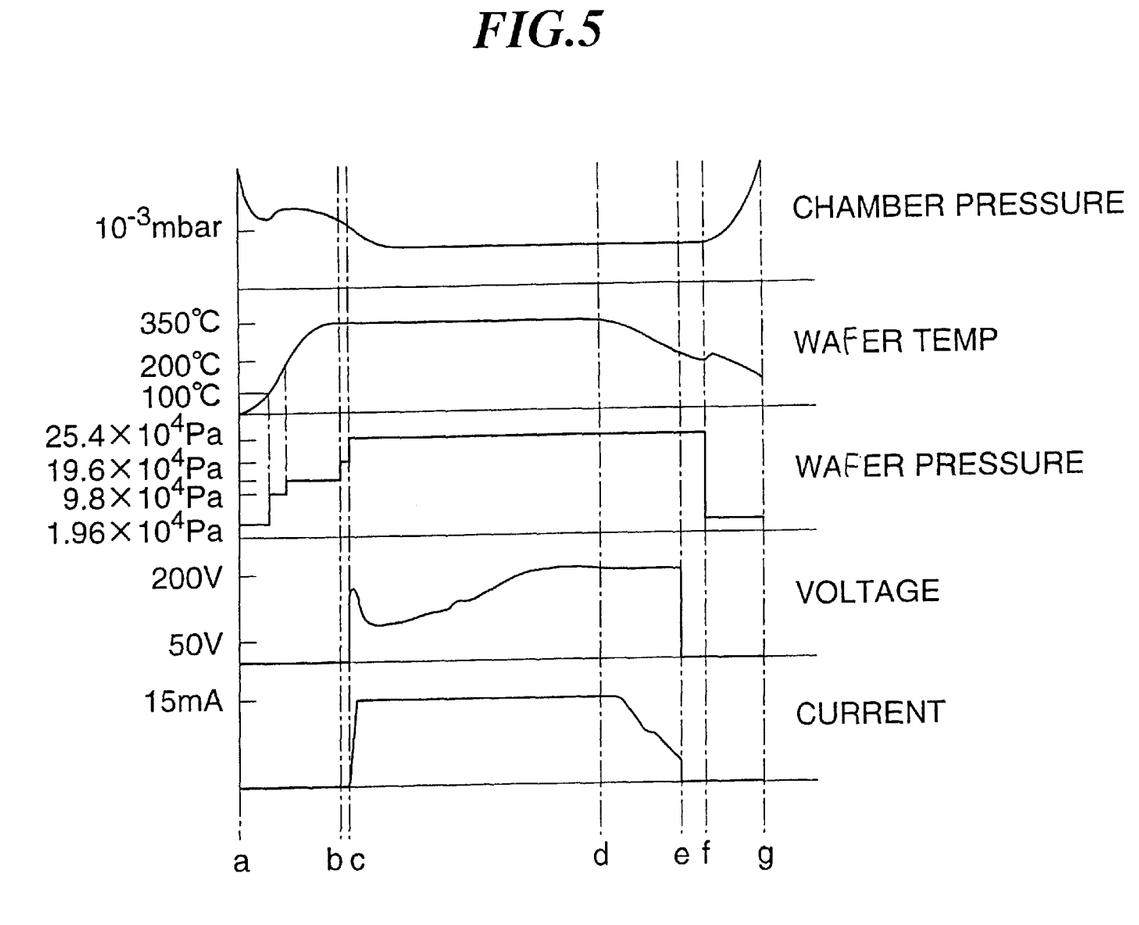
FIG. 5 illustrates bonding conditions in the third embodiment.

Now, with reference to FIG. 5, the following description is provided about in what procedure the silicon wafers 24 and 38 with the uncured resin layer formed therebetween are to be bonded together.

A vacuum pump 20 is operated to reduce the pressure of a wafer environment in the interior of a bonding apparatus 10. Power is fed to an apparatus heater (not shown) to increase the temperature of a wafer pair 52 (a in FIG. 5). While the wafer temperature rises, pressures are applied stepwise to the wafer pair 52 in a direction perpendicular to the bonding surfaces of the wafers (e.g., about $9.8 \times 10^4$ Pa at 100° C., $14.7 \times 10^4$ Pa at 200° C., $19.6 \times 10^4$ Pa at 300° C., and $24.5 \times 10^4$ Pa at 350° C.) (a–b in FIG. 5). This is for maintaining a gap of a certain size or smaller at the bonding interface and thereby carrying out the bonding in a satisfactory manner. Since the resin layer 46 is in an uncured state in this embodiment, curing will proceed with evolution of a certain gas if the temperature is increased. Thus, an environment pressure-reducing curve is different from those in the first and second embodiments. (See the Chamber Pressure curve in FIG. 5. Though different according to materials, at a temperature of 200° C. or so, gas issues and the degree of vacuum drops temporarily.)

When the wafer environment pressure has reached a level below $10^{-3}$ mbr after the wafer temperature reached a desired temperature (a value near a curing temperature recommended by the manufacturer of the resin material, say, 350° C.), voltage is applied across the wafers of the wafer pair 52. At this time, the maximum voltage set for a power supply is 200V and a supply voltage with a limiter (a constant current source) of about 15 mA is applied (c in FIG. 5). Voltage is varied in the range not exceeding 200V while controlling the electric current so as not to flow above a certain value by this power supply.

Voltage applied to the wafer pair 52 is monitored after the above voltage application and when it has reached a level of a certain value (e.g., 200V) or higher and the wafer environment pressure has become constant at a level of a certain value ($10^{-4}$ mbar) or lower, that is, when there is little outgas from the material of the resin layer 46, the apparatus heater is turned OFF to let the temperature drop. In FIG. 5, outgas vanishes when the wafer environment pressure has reached a level below $10^{-4}$ mbr, and it is presumed that a curing reaction of the resin layer 46 is nearly completed (d in FIG. 5). A certain performance of the vacuum pump 20 permits the wafer environment pressure to reach a level below $10^{-4}$ mbr even under outgassing. In this case, by comparing with a vacuum degree profile in the absence of outgas, it is possible to predict at what time point the curing reaction of the resin layer 46 terminated.

When the temperature has reached a level of a certain value (e.g., 100° C.) or lower, the voltage application is stopped (e in FIG. 5), then the pressure applied to the wafers is reduced to its initial value and the vacuum pump 20 is turned OFF to let the interior of the bonding apparatus open to the atmospheric pressure (f in FIG. 5). Lastly, the pressure on the wafer pair 52 is relieved and the wafer pair 52 is taken out of the apparatus (g in FIG. 5). Now, the bonding process is completed.

Although in this embodiment a constant current source is used for the supply voltage, a constant voltage source may be used as in the first and second embodiments. However, in the case where the curing reaction of the resin layer 46 is carried out simultaneously in the bonding process as in this embodiment, it is required in many cases to use a temperature much higher than the glass transition point temperature of the resin layer 46. If a constant voltage source is used in such a case, there may flow a large current, or the resin layer 46 may move to an excess degree, making it impossible to effect a desired bonding.

Figure 12:
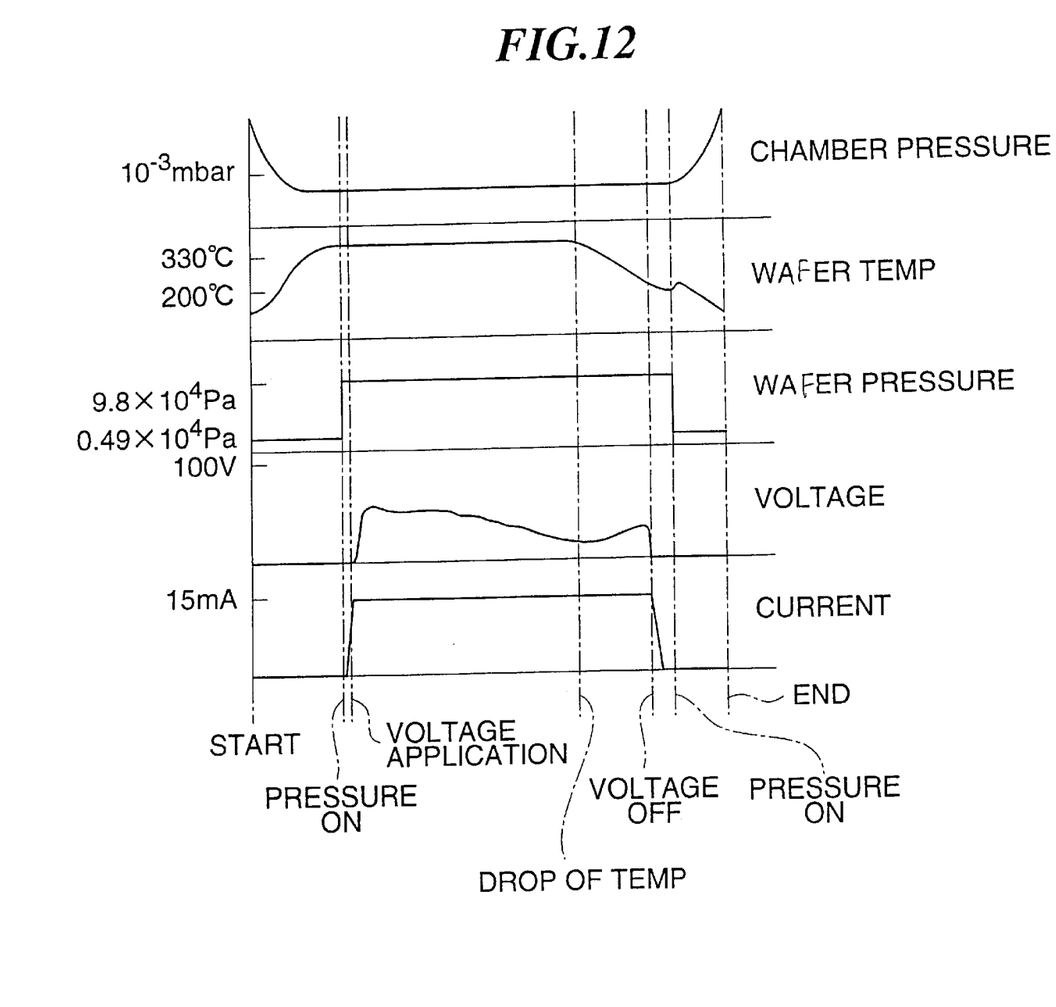
FIG. 12 illustrates bonding conditions in a modification according to the present invention.

Although the apparatus temperature is started to drop when the voltage value has reached a level of a certain value or higher in this third embodiment and when the current value has reached a level of a certain value or lower in the first and second embodiments, for a certain material of the resin layer 46 and for a certain temperature condition, the bonding process may be terminated upon the lapse of a certain time for preventing an excessive movement of the resin layer 46 and for shortening the process time, even if there is scarcely any voltage rise (in this third embodiment) or any current drop (in the first and second embodiments) (FIG. 12).

According to this third embodiment there are attained the same effects as in the first and second embodiments. In addition, since the resin layer 46 in an uncured state is cured in the bonding process, it is possible to omit the resin layer planarizing step such as CMP as a treatment prior to the bonding and also possible to implement bonding of a high bonding force.

FIG. 6 is a sectional view of an ink flowing path in an ink jet head after the bonding carried out by this embodiment. FIGS. 6A and B illustrate sections of ink flowing paths in an ink jet head in which ink flowing grooves are formed in a silicon wafer in accordance with a reactive ion etching (RIE) technique, and FIGS. 6C and 6D illustrate sections of ink flowing paths in an ink jet head in which ink flowing paths are formed in a silicon wafer in according with an anisotropic etching (ODE) technique. A device substrate 26 and an ink flowing path substrate 40 are bonded together through the resin layer 46.

Figure 6A:
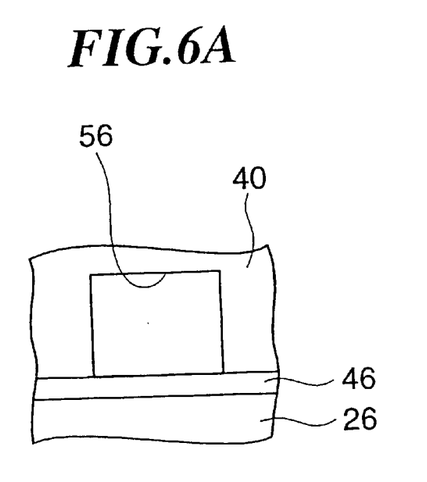
FIGS. 6A to 6D illustrate ink flowing paths after the completion of bonding.
Figure 6B:
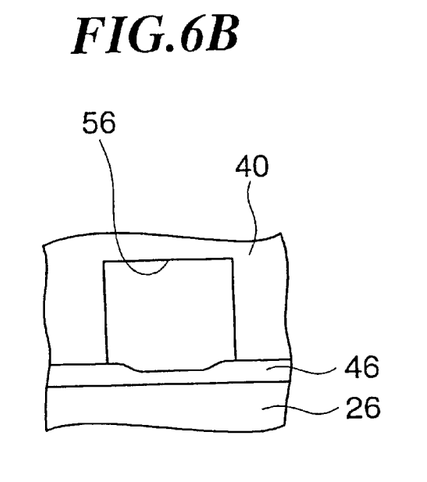
Figure 6C:
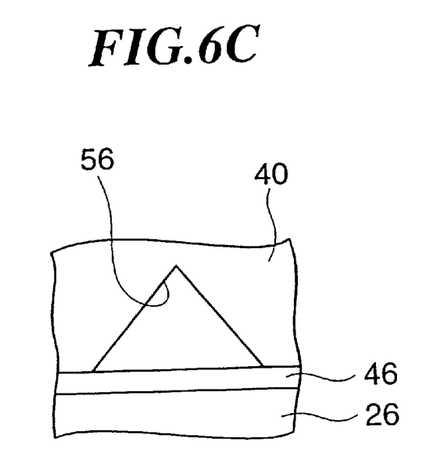
Figure 6D:
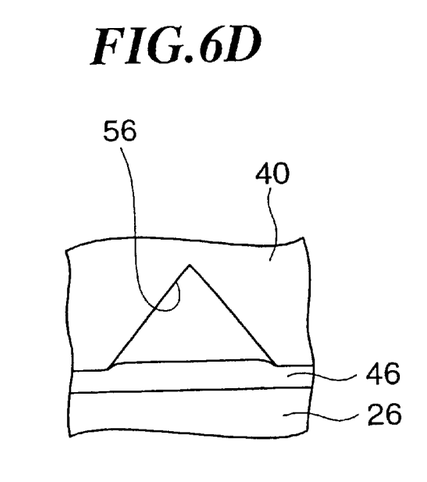

FIGS. 6A and 6C each illustrate an ideally bonded state, in which the resin layer 46 is formed flat even in the vicinity of a nozzle portion 56. On the other hand, FIG. 6B shows an example in which the initial gap of the resin layer 46 is large and the resin moved to excess in the bonding process. In the same figure there can be observed a movement of the resin layer 46 to a bonded area of a high electrostatic attraction from a portion of the resin layer which portion corresponds to an ink flowing path in the nozzle portion 56. FIG. 6D shows a state in which a portion of the resin layer 46 corresponding to the interior of the ink flowing path is raised due to excessive bonding conditions (heat and pressure).

[Fourth Embodiment]

Also in this fourth embodiment, as to the same portions as in the previous embodiments, explanations thereof will be omitted and only different portions will be explained.

Figure 7A:
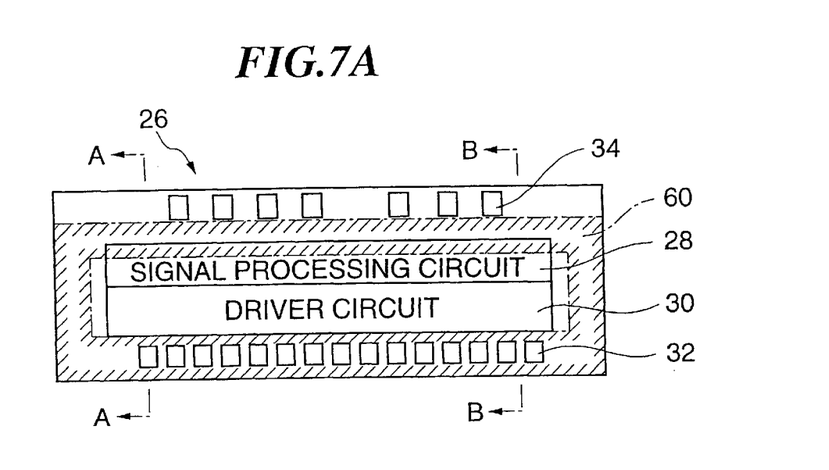
FIGS. 7A, 7B and 7C illustrate a device substrate in the fourth embodiment.
Figure 7B:
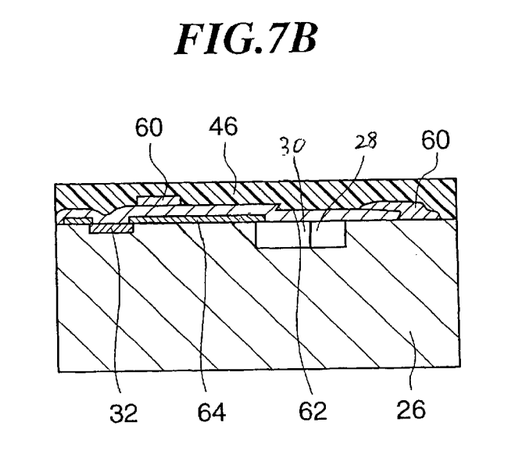
Figure 7C:
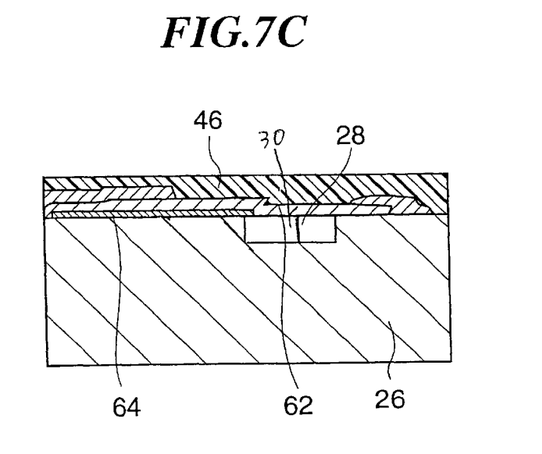
Figure 8A:
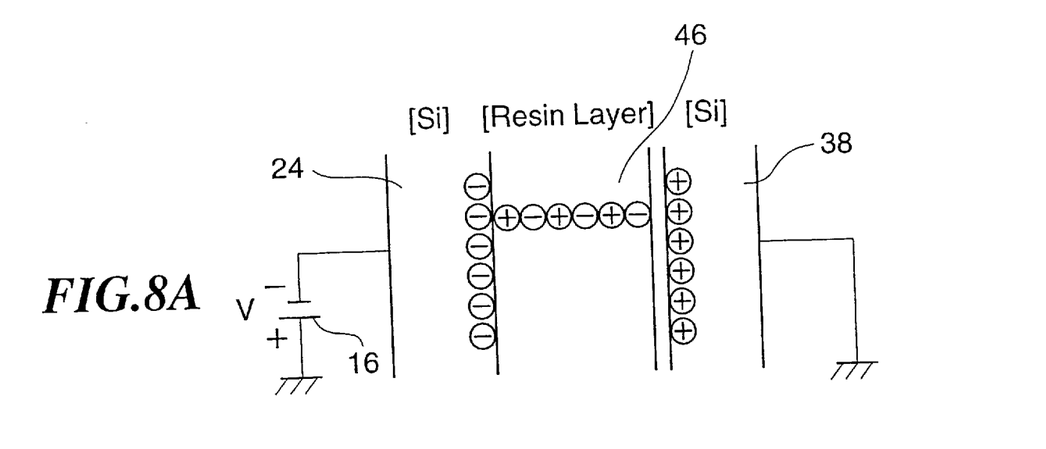
FIGS. 8A to 8D illustrate a bonded state attained by electron migration in accordance with the present invention.
Figure 8B:
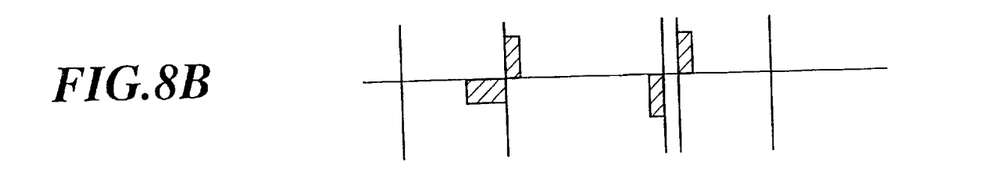
Figure 8C:
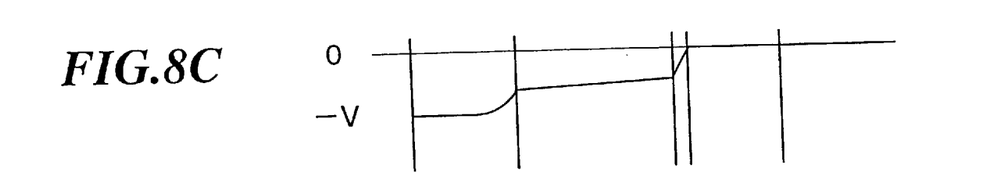
Figure 8D:
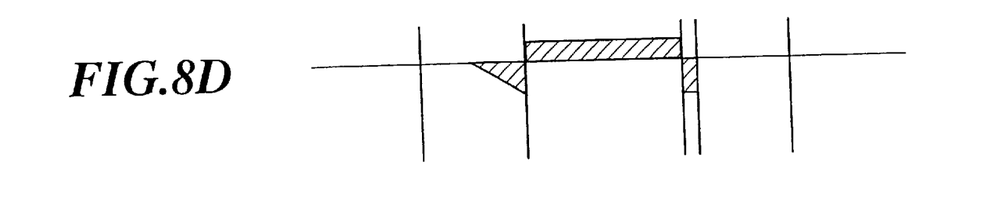

FIG. 7A is a plan view of a device substrate 26 used in this fourth embodiment, FIG. 7B is a sectional view taken on line A—A in FIG. 7A, and FIG. 7C is a sectional view taken on line B—B in FIG. 7A. In a lower area of a resin layer 46 contacted with at least an ink flowing path substrate 40 there is formed a pattern 60 of aluminum or another metal. Preferably, when voltage is applied to the back of the resin layer 46-formed side of the device substrate 26, the whole area of the metallic pattern 60 becomes almost equal in potential.

As to the bonding procedure, any of the procedures described in the above embodiments (the first to the third embodiment) may be adopted.

According to this fourth embodiment, when voltage is applied across the wafers of a wafer pair 52 in the bonding process, a potential distribution (field distribution) on a wafer surface bonded to the resin layer 46 is made almost uniform, whereby it is possible to eliminate a difference in potential distribution (field distribution) in the resin layer 46 based on circuits and wiring patterns which are formed on the wafer and hence possible to prevent the occurrence of unevenness in bonding between bonding surfaces and also prevent movement of the resin layer 46 in the bonding surfaces. Consequently, a uniform and satisfactory bonding can be attained.

According to the present invention, as set forth above, since a resin material is sandwiched between plural substrates and voltage is applied across the plural substrates to bond the substrates, there can be implemented good substrate-to-substrate bonding at low cost.

What is claimed is:

1. A substrate bonding method comprising the steps of:
   holding a resin material between plural substrates;
   raising a temperature of the plural substrates to a first predetermined temperature;
   applying a predetermined pressure to the plural substrates;
   applying a predetermined voltage across the plural substrates;
   starting to reduce the temperature of the plural substrates after a value of an electric current flowing across the plural substrates has reached a level of a certain current value or lower, or upon the lapse of a predetermined time after the voltage application; and
   stopping the application of the voltage and the application of the pressure after the temperature of the plural substrates has dropped to a second predetermined temperature or lower.

2. A substrate bonding method according to claim 1, wherein the voltage is 350V or lower.

3. A substrate bonding method according to claim 2, wherein the voltage is about 50V.

4. A substrate bonding method according to claim 1, wherein a pressure is applied to the plural substrates at the time of the voltage application.

5. A substrate bonding method according to claim 1, wherein the plural substrates are held at a temperature of 200° C. or higher at the time of the voltage application.

6. A substrate bonding method according to claim 1, wherein a maximum temperature of the plural substrates at the time of the voltage application is a heat-resisting temperature of the resin material or lower and a glass transition point temperature of the resin material or higher.

7. A substrate bonding method according to claim 1, wherein the resin material before the bonding is in an uncured state and is cured completely simultaneously with or after the bonding.

8. A substrate bonding method according to claim 1, wherein at least one of the plural substrates is formed of silicon.

9. A substrate bonding method according to claim 3, wherein the application of the pressure to the plural substrates is performed in at least two pressure levels during the rise in temperature of the plural substrates.

10. A substrate bonding method according to claim 1, wherein the application of the pressure to the plural substrates is performed in at least two pressure levels during the rise in temperature of the plural substrates.

11. A substrate bonding method according to claim 1, wherein a metallic pattern is formed on at least one of the bonding surfaces of each pair of the plural substrates holding the resin material therebetween.

12. A substrate bonding method according to claim 1, wherein bonding surfaces of at least one of the plural substrates and the resin material are subjected to cleaning and activation before the bonding.

* * * * *